US012579709B2

(12) United States Patent
Sun et al.

(10) Patent No.: US 12,579,709 B2
(45) Date of Patent: Mar. 17, 2026

(54) IMAGE SPECIAL EFFECT PROCESSING METHOD AND APPARATUS

(71) Applicant: Beijing Bytedance Network Technology Co., Ltd., Beijing (CN)

(72) Inventors: Juntao Sun, Beijing (CN); Yang Lv, Beijing (CN); Gao Liu, Beijing (CN); Ruifeng Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/888,216

(22) Filed: Aug. 15, 2022

(65) Prior Publication Data

US 2022/0392130 A1 Dec. 8, 2022

Related U.S. Application Data

(63) Continuation of application No. PCT/CN2021/077737, filed on Feb. 24, 2021.

(30) Foreign Application Priority Data

Feb. 27, 2020 (CN) .......................... 202010122421.7

(51) Int. Cl.
| | |
|---|---|
| *G06T 11/60* | (2006.01) |
| *G06F 3/0482* | (2013.01) |

(Continued)

(52) U.S. Cl.
CPC ............ *G06T 11/60* (2013.01); *G06F 3/0482* (2013.01); *G06F 3/04845* (2013.01); *G06T 7/194* (2017.01); *G06T 2200/24* (2013.01)

(58) Field of Classification Search
CPC ..... G06T 11/60; G06T 2200/24; G06T 7/194; H04N 5/262; H04N 5/272; H04N 5/2621;

(Continued)

(56) References Cited

U.S. PATENT DOCUMENTS

| | | | | |
|---|---|---|---|---|
| 10,269,164 B1 * | 4/2019 | Song | ........................ | G06T 11/60 |
| 11,640,683 B2 * | 5/2023 | Xu | .......................... | G06T 11/60 |
| | | | | 345/589 |

(Continued)

FOREIGN PATENT DOCUMENTS

| | | |
|---|---|---|
| CN | 107181976 A | 9/2017 |
| CN | 107347166 A | 11/2017 |

(Continued)

OTHER PUBLICATIONS

International Search Report and Written Opinion issued in International Patent Application No. PCT/CN2021/077737 on May 20, 2021.

(Continued)

*Primary Examiner* — Jin Cheng Wang
(74) *Attorney, Agent, or Firm* — Astute IP Law Group

(57) ABSTRACT

The present disclosure discloses an image special effect processing method and apparatus, an electronic device and a computer-readable storage medium. The method includes: in response to an instruction for adding a special effect object on an initial image, determining a target display region of the special effect object on the initial image, where the target display region is a foreground region or a background region of the initial image, the foreground region is an image region where a target object is located in the initial image, and the background region is an image region other than the foreground region in the initial image; and displaying a part of the special effect object located in the target display region on the initial image to obtain a target image.

8 Claims, 4 Drawing Sheets

(51) Int. Cl.
 *G06F 3/04845* (2022.01)
 *G06T 7/194* (2017.01)

(58) Field of Classification Search
 CPC .. H04N 23/62; H04N 23/631; G06F 3/04845; G06F 3/01; G06F 3/0482
 See application file for complete search history.

(56) References Cited

U.S. PATENT DOCUMENTS

| | | | |
|---|---|---|---|
| 2004/0130736 A1* | 7/2004 | Lee | H04N 1/6011 358/1.9 |
| 2009/0043674 A1* | 2/2009 | Minsky | G06Q 30/0603 715/765 |
| 2009/0060334 A1 | 3/2009 | Rayner | |
| 2009/0204880 A1* | 8/2009 | Ko | G09B 5/062 715/764 |
| 2010/0299621 A1* | 11/2010 | Piehler | H04N 1/00312 715/764 |
| 2013/0063468 A1 | 3/2013 | Hikida | |
| 2013/0239056 A1* | 9/2013 | Ubillos | G06F 3/04845 715/833 |
| 2014/0029804 A1* | 1/2014 | Kawaguchi | G06T 11/60 382/105 |
| 2015/0117777 A1 | 4/2015 | Hsun | |
| 2015/0235389 A1* | 8/2015 | Miller | G06Q 30/0627 345/594 |
| 2015/0278986 A1* | 10/2015 | Edwin | G06F 3/04842 345/428 |
| 2017/0139573 A1* | 5/2017 | Li | G06T 11/60 |
| 2017/0192651 A1* | 7/2017 | Yang | G06F 3/04845 |
| 2018/0068475 A1* | 3/2018 | Blue | G06T 11/60 |
| 2018/0234708 A1* | 8/2018 | Chong | H04N 21/472 |
| 2018/0341647 A1* | 11/2018 | Hiraishi | G06F 16/00 |
| 2019/0058827 A1* | 2/2019 | Park | H04N 23/62 |
| 2019/0132642 A1* | 5/2019 | Wang | H04N 21/8549 |
| 2019/0187880 A1* | 6/2019 | Dalonzo | G11B 27/00 |
| 2019/0213713 A1 | 7/2019 | Tsai et al. | |
| 2020/0051304 A1* | 2/2020 | Choi | G06T 7/246 |
| 2020/0174656 A1* | 6/2020 | Shin | G06T 11/00 |
| 2020/0177823 A1* | 6/2020 | Zhu | H04N 7/141 |
| 2020/0334875 A1* | 10/2020 | Xu | G06T 11/203 |
| 2020/0342631 A1* | 10/2020 | Bickerstaff | G06T 7/194 |
| 2020/0351450 A1* | 11/2020 | Kim | G06V 20/41 |
| 2020/0380625 A1* | 12/2020 | Watson | G06Q 10/10 |
| 2020/0380635 A1* | 12/2020 | Bushell | G06F 3/14 |
| 2021/0042950 A1* | 2/2021 | Wantland | G06T 19/006 |
| 2021/0074067 A1* | 3/2021 | Kwon | G06F 3/16 |
| 2021/0287439 A1* | 9/2021 | Goodrich | G06T 7/194 |
| 2021/0375022 A1* | 12/2021 | Lee | G06T 17/10 |
| 2021/0383588 A1* | 12/2021 | Lee | H04N 23/631 |
| 2022/0014819 A1* | 1/2022 | Liu | H04N 21/4316 |
| 2022/0067888 A1* | 3/2022 | Yu | G06V 10/82 |
| 2022/0070385 A1* | 3/2022 | Van Os | H04M 1/72439 |
| 2022/0084168 A1* | 3/2022 | Lee | G06T 11/001 |
| 2022/0139016 A1* | 5/2022 | Wei | G06T 7/70 382/100 |
| 2022/0232172 A1* | 7/2022 | Wang | G06F 3/0482 |
| 2022/0270215 A1* | 8/2022 | Lee | G06T 7/536 |
| 2023/0305688 A1* | 9/2023 | Triverio | G06F 3/0482 |

FOREIGN PATENT DOCUMENTS

| | | |
|---|---|---|
| CN | 108012091 A | 5/2018 |
| CN | 108109161 A | 6/2018 |
| CN | 109302619 A | 2/2019 |
| CN | 109859102 A | 6/2019 |
| CN | 110012352 A | 7/2019 |
| CN | 110147805 A | 8/2019 |
| CN | 110475150 A | 11/2019 |
| CN | 110493630 A | 11/2019 |
| CN | 110536151 A | 12/2019 |
| CN | 110751659 A | 2/2020 |
| JP | 2013077296 A | 4/2013 |
| JP | 2016184864 A | 10/2016 |
| JP | 2018181044 A | 11/2018 |
| JP | 2019192061 A | 10/2019 |

OTHER PUBLICATIONS

Chinese First Office Action issued in Chinese Patent Application No. 202010122421.7 on Dec. 14, 2021.
Chinese Second Office Action issued in Chinese Patent Application No. 202010122421.7 on Jun. 14, 2022.
Extended European Search Report in EP21759634.5, mailed Jul. 7, 2023, 8 pages.
Office Action in JP2022552171, mailed Oct. 3, 2023, 6 pages.
Communication pursuant to Article 94(3) EPC in European Patent Application No. 21759634.5, mailed Mar. 21, 2024, 5 pages.
Notice of Allowance for Korean Patent Application No. 10-2022-7030386, mailed on Oct. 27, 2024, 6 pages.

* cited by examiner

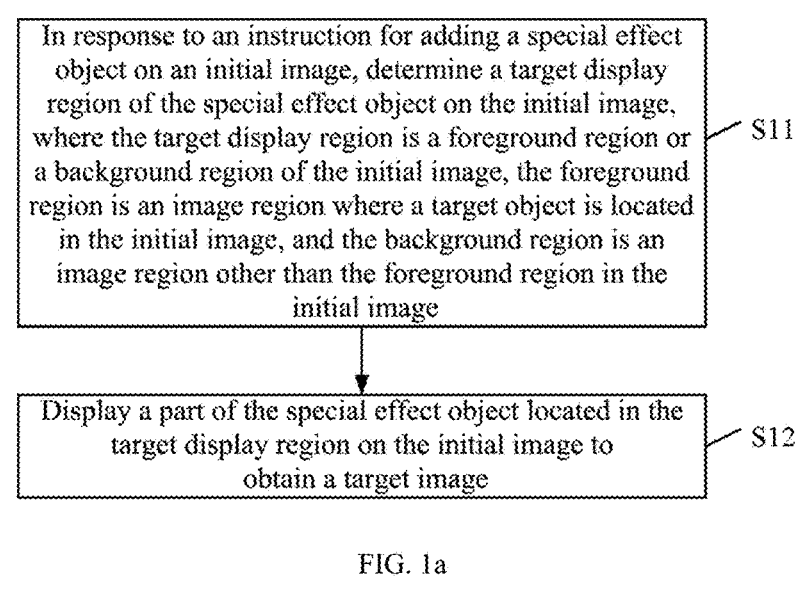

In response to an instruction for adding a special effect object on an initial image, determine a target display region of the special effect object on the initial image, where the target display region is a foreground region or a background region of the initial image, the foreground region is an image region where a target object is located in the initial image, and the background region is an image region other than the foreground region in the initial image — S11

Display a part of the special effect object located in the target display region on the initial image to obtain a target image — S12

FIG. 1a

Special effect information

● Foreground special effect

● Background special effect

FIG. 1c

IMAGE SPECIAL EFFECT PROCESSING METHOD AND APPARATUS

CROSS-REFERENCE TO RELATED APPLICATIONS

This application is a continuation of International Application No. PCT/CN2021/077737, filed on Feb. 24, 2021, which claims the priority to Chinese patent application No. 202010122421.7 titled "IMAGE SPECIAL EFFECT PRO-CESSING METHOD AND APPARATUS" and filed with the China National Intellectual Property Administration on Feb. 27, 2020. The entire contents of both of the above applications are incorporated into this application by reference in their entities.

TECHNICAL FIELD

The present disclosure relates to the technical field of image special effect processing, and in particular, to an image special effect processing method and apparatus, and a computer-readable storage medium.

BACKGROUND

With the development of intellectual terminal technology, functions of intellectual terminals are becoming more and more varied. For example, a user can use a camera in a terminal to take an image (e.g., a photo or a video), which has become a new mode of entertainment for people. However, simply taking images can no longer meet needs of users. How to perform special effect processing on captured images to get more fun and interesting images has become the focus of people's attention.

In prior art, the special effect is usually applied to a whole image. In some scenarios, the special effect processing method cannot achieve a good result. For example, a face sticker is usually applied to a face, and if the face sticker is applied to the whole image, which would make the whole image look strange and cannot achieve a good result.

SUMMARY

The summary is provided to introduce concepts in a simplified form, and the concepts will be described in detail in the following description of embodiments. The summary is not intended to identify key features or essential features of the claimed technical solution, nor is it intended to be used to limit the scope of the claimed technical solution.

The technical purpose to be achieved by the present disclosure is to provide an image special effect processing method, so as to at least partially solve the technical problem that a good result cannot be achieved through the special effect processing method in the prior art. In addition, an image special effect processing apparatus, an image special effect processing hardware apparatus, a computer-readable storage medium and an image special effect processing terminal are also provided.

In order to achieve the above purpose, according to one aspect of the present disclosure, the following technical solution is provided:

an image special effect processing method, including:

in response to an instruction for adding a special effect object on an initial image, determining a target display region of the special effect object on the initial image, where the target display region is a foreground region or a background region of the initial image, the foreground region is an image region where a target object is located in the initial image, and the background region is an image region other than the foreground region in the initial image; and displaying a part of the special effect object located in the target display region on the initial image to obtain a target image.

In order to achieve the above purpose, according to one aspect of the present disclosure, the following technical solution is provided:

an image special effect processing apparatus, including:

a target display region determining module, configured to:

in response to an instruction for adding a special effect object on an initial image, determine a target display region of the special effect object on the initial image, where the target display region is a foreground region or a background region of the initial image, the fore-ground region is an image region where a target object is located in the initial image, and the background region is an image region other than the foreground region in the initial image; and a special effect displaying module, configured to display a part of the special effect object located in the target display region on the initial image to obtain a target image.

In order to achieve the above purpose, according to one aspect of the present disclosure, the following technical solution is provided:

an electronic device, including:

a memory, configured to store non-transitory computer-readable instructions; and a processor, configured to run the computer-readable instructions, so that when the processor executes the computer-readable instructions, the image special effect processing method according to any one of the above aspects is implemented.

In order to achieve the above purpose, according to one aspect of the present disclosure, the following technical solution is provided:

a computer-readable storage medium, configured to store non-transitory computer-readable instructions, where when the non-transitory computer-readable instructions are executed by a computer, the computer is caused to execute the image special effects processing method according to any one of the above aspects.

A computer program product, including a computer pro-gram instruction, where the computer program instructions causes a computer to execute the image special effect processing method according to any one of the above aspects.

A computer program, where when the computer program runs on a computer, the computer is caused to execute the image special effect processing method according to any one of the above aspects.

In order to achieve the above purpose, according to another aspect of the present disclosure, the following technical solution is provided:

an image special effect processing terminal, including the above image special effect processing apparatus.

In embodiments of the present disclosure, by determining a target display region of a special effect object on an initial image, and displaying of the special effect object located in the target display region on the initial image, the special effect object can be displayed differently, thereby achieving a better result.

The above description is only an overview of the technical solutions of the present disclosure. In order to understand the technical means of the present disclosure more clearly, it can be implemented according to the content of the description, and to make the above and other purposes, features and advantages of the present disclosure more obvious and easy to understand, preferred embodiments are provided in particular, in conjunction with the accompanying drawings, and details are as follows.

BRIEF DESCRIPTION OF DRAWINGS

The above and other features, advantages and aspects of various embodiments of the present disclosure will become more apparent when taken in conjunction with the accompanying drawings and with reference to the following description of embodiments. Throughout the drawings, same or similar reference numbers refer to the same or similar elements. It should be understood that the drawings are schematic and that components and elements are not necessarily drawn to scale.

FIG. 1a is a schematic flowchart of an image special effect processing method according to an embodiment of the present disclosure.

FIG. 1c is a schematic diagram of a second interface provided in an image special effect processing method according to an embodiment of the present disclosure.

DESCRIPTION OF EMBODIMENTS

Figure 1B:
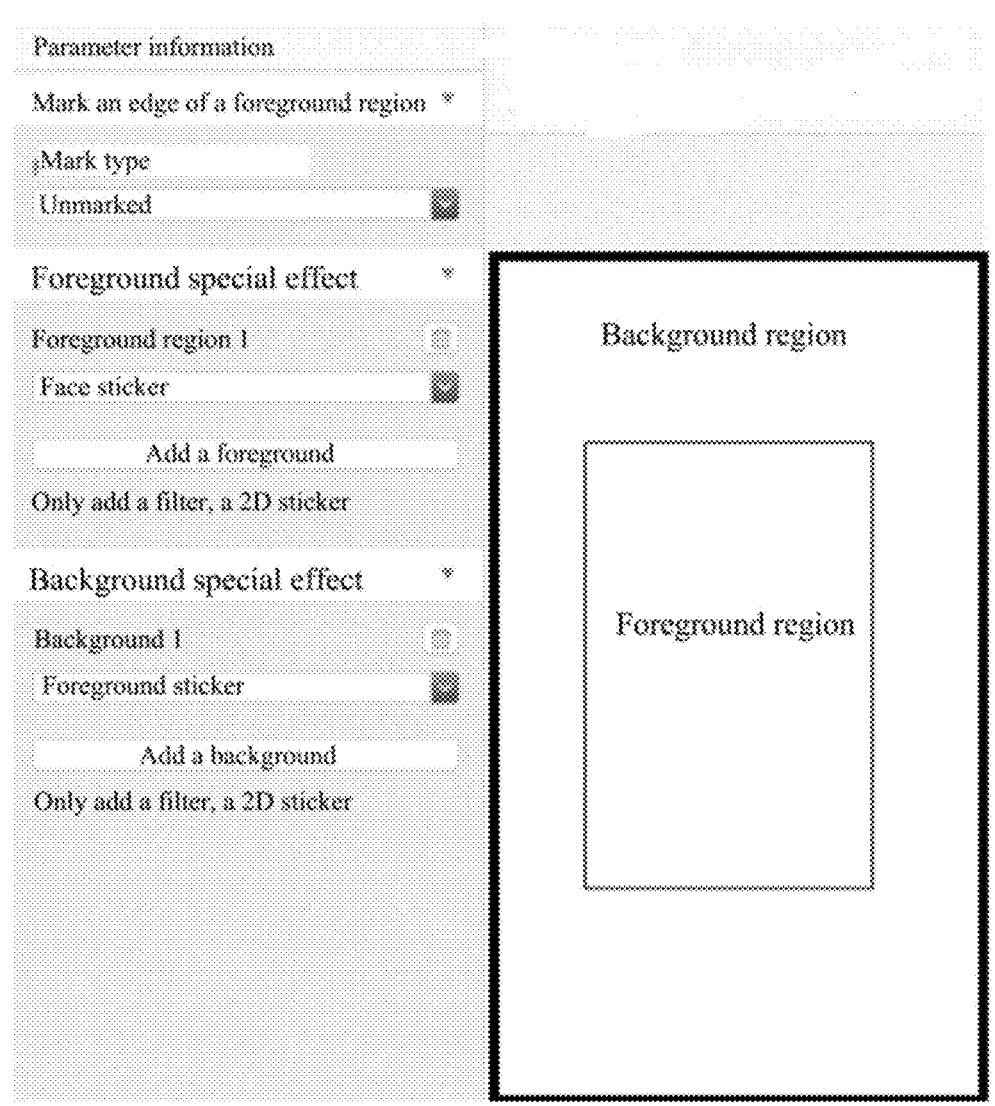
FIG. 1B is a schematic diagram of a first interface provided in an image special effect processing method according to an embodiment of the present disclosure.

Embodiments of the present disclosure will be described in more detail below with reference to the accompanying drawings. Although certain embodiments of the present disclosure are illustrated in the accompanying drawings, it should be understood that the present disclosure may be implemented in various forms and should not be construed as limited to the embodiments set forth herein. By contrary, the embodiments are provided for the purpose of a more thorough and complete understanding of the present disclosure. It should be understood that the accompanying drawings and embodiments of the present disclosure are only for exemplary purposes, and are not intended to limit the protection scope of the present disclosure.

It should be understood that the various steps described in the method embodiments of the present disclosure may be performed in different orders, or performed in parallel. Furthermore, method embodiments may include additional steps or execution of the illustrated steps may be omitted. The scope of the present disclosure is not limited in this regard.

As used herein, the term "including" and variations thereof refer to open inclusions, i.e., "including but not limited to". The term "based on" refers to "based at least in part on". The term "one embodiment" represents "at least one embodiment"; the term "another embodiment" represents "at least one additional embodiment"; the term "some embodiments" represents "at least some embodiments". Relevant definitions of other terms will be given in the description below.

Embodiment I

In order to solve the technical problem that special effect processing methods in the prior art cannot achieve good results, an embodiment of the present disclosure provides an image special effect processing method. As shown in FIG. 1a, the image special effect processing method mainly includes the following steps S11 to S12.

Step S11: in response to an instruction for adding a special effect object on an initial image, determine a target display region of the special effect object on the initial image, where the target display region is a foreground region or a background region of the initial image, the foreground region is an image region where a target object is located in the initial image, and the background region is an image region other than the foreground region in the initial image.

Specifically, the initial image may be a video image input in real time, for example, a live video in a short video application, or a video image pre-stored in a terminal. The image can also be a static image, i.e., a picture. The terminal may be a mobile terminal, such as a smart phone or a tablet computer, or may be a fixed terminal, such as a desktop computer.

The instruction for adding a special effect object may include an identifier or a storage location of the special effect object, and the corresponding special effect object can be acquired from the Internet, a server or a terminal locally according to the identifier or the storage location. Alternatively, the instruction for adding a special effect object includes a special effect object, and in this case, there is no need to additionally acquire the corresponding special effect object, instead, the special effect object is directly parsed from the instruction.

There may be one or more special effect objects to be added, and when there are more than one special effect object, the target display region of each special effect object on the initial image is determined respectively. The target display region is the foreground region or the background region of the initial image. Specifically, the user can select a corresponding special effect object according to needs, and determine the target display region according to a type of the selected special effect object. For example, if a special effect object is a special effect (such as, a face sticker) used to be displayed in the foreground region, the target display region of the special effect object is determined to be the foreground region; if a special effect object is a special effect (such as, a bullet screen) used to be displayed in the background region, the target display region of the special effect object is determined to be the background region; or if a special effect object is to mark an edge of the foreground region, the target display region of the special effect object is determined to be the edge of the foreground region. An example is taken where the initial image is a face image, if the special effect object selected by the user is a face sticker, an instruction for adding the special effect is generated according to the face sticker, where the instruction for adding the special effect includes a target display region, and the target display region is the foreground region.

When determining the foreground region and the background region of the initial image, it is possible to separate the foreground region and the background region of the initial image through methods in the prior art. For example, a target recognition algorithm can be used to identify the image to obtain the image region where the target object is located, and the image region where the image region in which the target object is located is removed is the background region. The target object may be a human face, a human body, or the like. For example, if the image is a face image, a face region in the image can be identified through a face recognition algorithm, the face region is then taken as the foreground region, and the rest of the image is the background region.

Step S12: display a part of the special effect object located in the target display region on the initial image to obtain a target image.

Specifically, if the target display region is the foreground region, the part of the special effect object located in the foreground region is displayed on the initial image; if the target display region is the background region, the part of the special effect object located in the background region is displayed on the initial image. If the target display region is the edge of the foreground region, the edge of the foreground region is marked, for example, an edge line of the foreground region is represented by a colored line or dots.

In the embodiment, through determination of a target display region of a special effect object on an initial image, and displaying of the special effect object located in the target display region on the initial image, the special effect object can be displayed differently, thereby achieving a better result.

In an optional embodiment, the step S12 specifically includes:

step S121: determine an overlapping region of a position region of the special effect object on the initial image and the target display region.

The special effect object is displayed on parts of multiple target display regions, and the overlapping region of the position region of each part on the initial image and the target display region is determined. For example, if the special effect object includes a part displayed on the foreground region and a part displayed on the background region, the foreground region and the background region on the initial image are determined respectively.

Step S122: cut a part located in the overlapping region from the special effect object as a target display object.

For example, if the special effect object includes a part displayed on the foreground region and a part displayed on the background region, the part displayed on the foreground region and the part displayed on the background region are respectively cut from the special effect.

Step S123: display the target display object on an upper layer of the overlapping region of the initial image to obtain the target image.

For example, if the special effect object includes a part displayed on the foreground region and a part displayed on the background region, then the target display objects are the part displayed on the foreground region and the part displayed on the background respectively region, so that the part displayed on the foreground region and the part displayed on the background region are correspondingly displayed on the foreground region and the background region of the initial image.

In an optional embodiment, the method further includes:

Step S13: in response to an operation by a user on a special effect parameter setting option on a special effect setting interface, generate the instruction for adding the special effect object on the initial image, where the special effect parameter setting option is used for the user to set the special effect object and the target display region, and the instruction is used to indicate the special effect object and the target display region.

Specifically, the special effect parameter setting option can be provided on the special effect setting interface, and the number of the special effect parameter setting options can be more than one, as shown in FIG. 1B, including a special effect option for displaying on the foreground region (that is, the foreground special effect), a special effect option for displaying on the background region (that is, the background special effect), and a special effect option for marking the edge of the foreground region, etc. The user can select the setting parameters according to these options, and can add multiple background special effects and/or foreground special effects. After the user has finished selecting the setting parameters, an instruction for adding the special effect object can be generated through triggering of an OK button on the special effect setting interface.

Further, the step S13 specifically includes:

Step S131: in response to a selecting operation on a special effect navigation tree on a first interface, determine the special effect object.

Figure 1C:
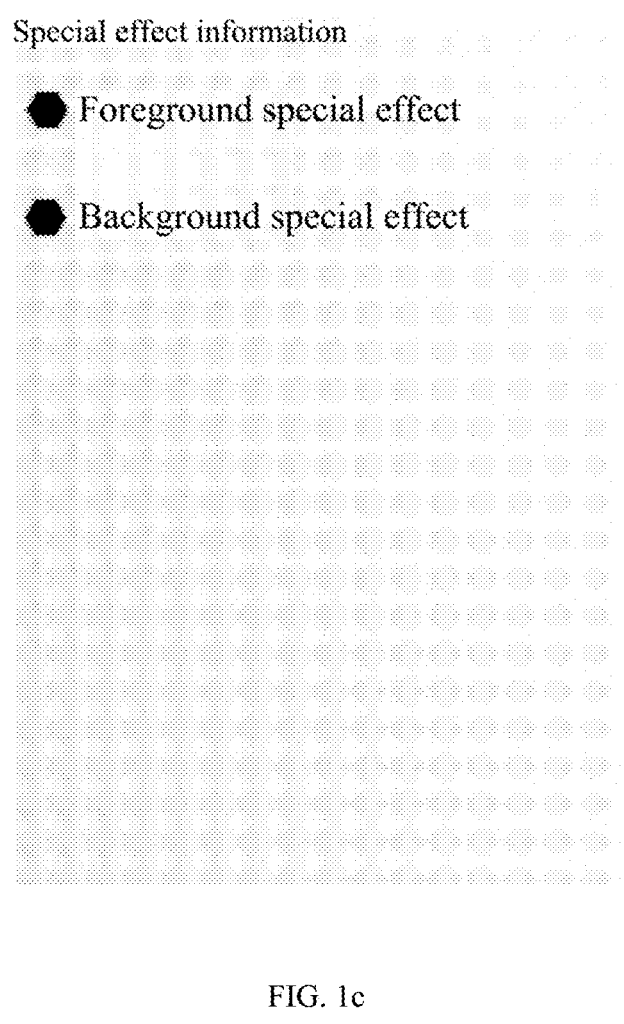

Specifically, as shown in FIG. 1c, a special effect navigation tree can be provided on the first interface, and the special effect navigation tree includes special effect options, and there are at least two special effect options, that is, a foreground special effect option and a background special effect option, where the foreground special effect option includes at least one foreground effect, and the background special effect option includes at least one background effect. The user can select the desired special effect object from the special effect options in the special effect navigation tree.

Step S132: in response to a selecting operation on a display region setting option on a second interface, determine the target display region.

The second interface and the first interface may be the same display interface.

Step S133: generate the instruction according to the special effect object and the target display region.

Further, the step S11 specifically includes: when the special effect object to be added includes a plurality of sub-effect objects, determine a target display region of each of the sub-effect objects respectively.

Correspondingly, the step S12 specifically includes: determining a display order of a respective sub-effect object in the special effect object respectively; displaying a part of the respective sub-effect object in the special effect object located in a respective target display region of the respective sub-effect object on the initial image in sequence according to the display sequence of the respective sub-effect object in the special effect object, to obtain the target image.

Further, before the step S12 is performed, the method further includes:

step S14: in response to an enabling trigger operation by a user on a switch option on a special effect setting interface, setting to a special effect enabled state;

step S12 is specifically as follows: under the special effect enabled state currently, display a part of the special effect object located in the target display region on the initial image to obtain a target image.

Specifically, a special effect switch option is provided on the special effect setting interface for users to choose whether to distinguish the foreground region and the background region when the special effect object is added. If the user wants to distinguish between the foreground region and the background region, the special effect switch option needs to be turned on, and at this time, the execution of operations of determining the foreground region and the background region of the image and the subsequent steps is triggered. If the user does not want to distinguish between the foreground region and the background region, the special effect switch option needs to be turned off, at this time, the foreground region will not be distinguished from the background region when the special effect object is displayed, and the special effect object can be displayed anywhere on the initial image.

Those skilled in the art should understand that, on the basis of the above embodiments, obvious modifications (for example, superimposing the listed modes) or equivalent substitutions can also be made.

In the above, although the steps in the embodiments of the image special effect processing method are described in the above-mentioned order, those skilled in the art should understand that the steps in the embodiments of the present disclosure are not necessarily executed in the above-mentioned order, and may also be performed in a reverse order, in parallel, in a crossing sequence and in other sequences. Moreover, on the basis of the above steps, those skilled in the art can also add other steps, these obvious modifications or equivalent alternatives should also be included within the scope of protection of the present disclosure, which will not be repeated here.

The following describes apparatus embodiments of the present disclosure. The apparatus embodiments of the present disclosure can be used to execute the steps implemented by the method embodiments of the present disclosure. For convenience of description, only the parts related to the embodiments of the present disclosure are shown, for the specific technical details not disclosed, reference can be made to the method embodiments of the present disclosure.

Embodiment II

Figure 2:
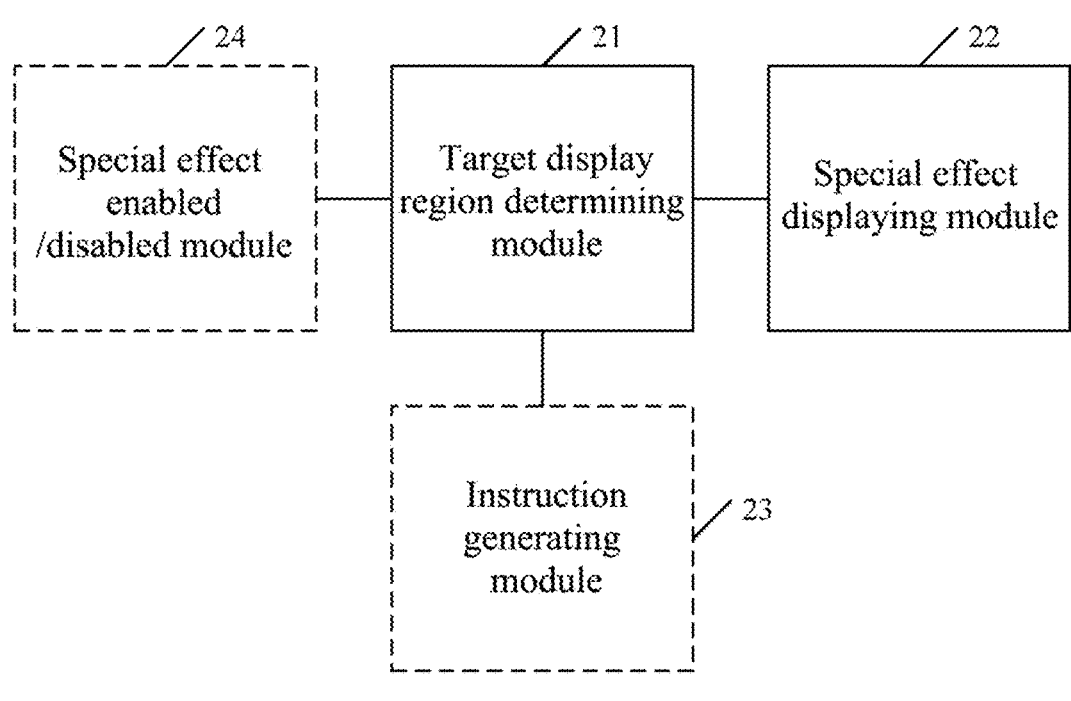
FIG. 2 is a schematic structural diagram of an image special effect processing apparatus according to an embodiment of the present disclosure.

In order to solve the technical problem that the special effect processing method in the prior art cannot achieve a good result, an embodiment of the present disclosure provides an image special effect processing apparatus. The apparatus may execute the steps in the embodiments of the image special effect processing method described in Embodiment I. As shown in FIG. 2, the apparatus mainly includes: a target display region determining module 21 and a special effect displaying module 22; where, the target display region determining module 21 is configured to: in response to an instruction for adding a special effect object on an initial image, determine a target display region of the special effect object on the initial image, where the target display region is a foreground region or a background region of the initial image, the foreground region is an image region where a target object is located in the initial image, and the background region is an image region other than the foreground region in the initial image; and the special effect displaying module 22 is configured to display a part of the special effect object located in the target display region on the initial image to obtain a target image.

Further, the special effect displaying module 22 is specifically configured to: determine an overlapping region of a position region of the special effect object on the initial image and the target display region; cut a part located in the overlapping region from the special effect object as a target display object; display the target display object on an upper layer of the overlapping region of the initial image to obtain the target image.

Further, the apparatus further includes:

an instruction generating module 23, configured to: in response to an operation by a user on a special effect parameter setting option on special effect setting interface, generate the instruction for adding the special effect object on the initial image, where the special effect parameter setting option is used for the user to set the special effect object and the target display region, and the instruction is used to indicate the special effect object and the target display region.

Further, the instruction generating module 23 is specifically configured to: in response to a selecting operation on a special effect navigation tree on a first interface, determine the special effect object; in response to a selecting operation on a display region setting option on a second interface, determine the target display region; and generate the instruction according to the special effect object and the target display region.

Further, the target display region determining module 21 is specifically configured to: when the special effect object to be added includes a plurality of sub-effect objects, determine a target display region of each of the sub-effect objects respectively; correspondingly, the special effect object displaying module 22 is specifically configured to: determine a display order of a respective sub-effect object in the special effect object respectively; display a part of the respective sub-effect object in the special effect object located in a respective target display region of the respective sub-effect object on the initial image in sequence according to the display sequence of the respective sub-effect object in the special effect object, to obtain the target image.

Further, the apparatus further includes:

a special effect enabled/disabled module 24, configured to in response to an enabling trigger operation by a user on a switch option on a special effect setting interface, set to a special effect enabled state;

the special effect displaying module 22 is specifically configured to: under the special effect enabled state currently, display the part of the special effect object located in the target display region on the initial image to obtain the target image.

Further, the special effect object is a sticker and/or a frame marking the target display region.

For detailed descriptions on the working principle and the technical effects achieved by the embodiments of the image special effect processing apparatus, reference may be made to the relevant descriptions in the foregoing image special effect processing method embodiments, which will not be repeated here.

Embodiment III

Referred to FIG. 3 below, it shows a schematic structural diagram of an electronic device 300 adapted to implement the embodiments of the present disclosure. The electronic device 300 in the embodiments of the present disclosure may include, but is not limited to, a mobile device, such as a mobile phone, a notebook computer, a digital broadcast receiver, a PDA (Personal Digital Assistant), a PAD (Portable Android Device), a PMP (Personal Multimedia Player), a vehicle terminal (e.g., a vehicle navigation terminal), etc., and a fixed terminal such as a digital TV, a desktop computer, etc. The electronic device shown in FIG. 3 is only an example, and should not bring any limitation to the function and scope of use for the embodiments of the present disclosure.

Figure 3:
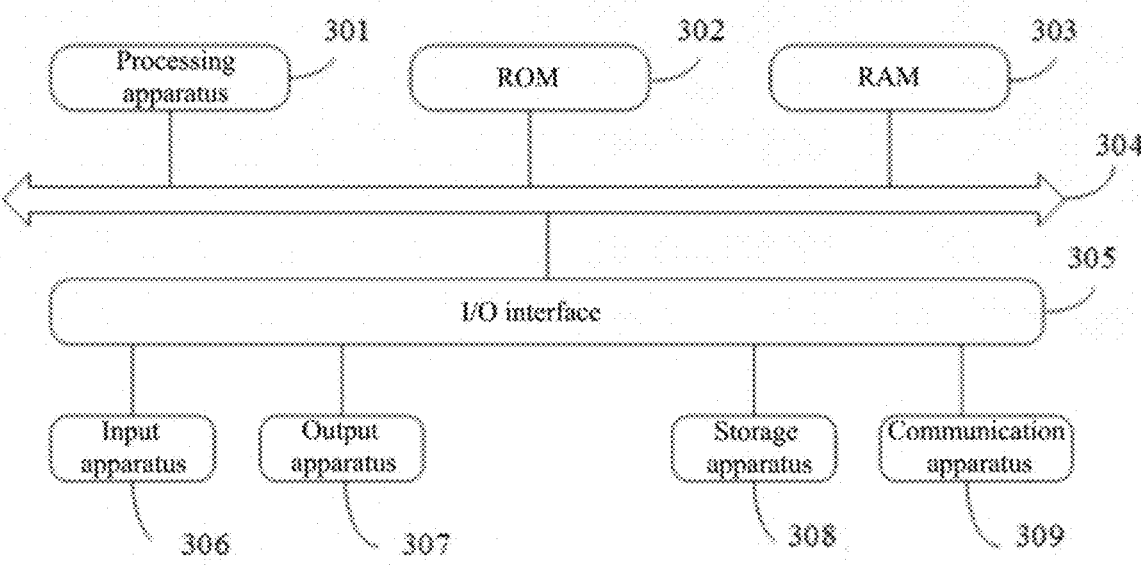
FIG. 3 is a schematic structural diagram of an electronic device according to an embodiment of the present disclosure.

As shown in FIG. 3, the electronic device 300 may include a processing apparatus 301 (such as a central processing unit, a graphics processor, etc.), which may execute various appropriate actions and processing according to programs stored in a read-only memory (Read-Only Memory, ROM) 302 or programs loaded into a random access memory (RAM) 303. In the RAM 303, various programs and data required for the operation of the electronic device 300 are also stored. The processing apparatus 301, the ROM 302, and the RAM 303 are connected to each other through a bus 304. An input/output (I/O) interface 305 is also connected to the bus 304.

Generally, the following apparatuses can be connected to the I/O interface 305: an input apparatus 306, including for example a touch screen, a touch panel, a keyboard, a mouse, a camera, a microphone, an accelerometer, a gyroscope, and the like; an output apparatus 307, including for example a liquid crystal display (LCD), a speaker, a vibrator, and the like; a storage apparatus 308, including for example a magnetic tape, a hard disk, and the like; and a communication apparatus 309. The communication apparatus 309 allows the electronic device 300 to perform wireless or wired communication with other devices to exchange data. Although FIG. 3 shows the electronic device 300 with multiple kinds of apparatuses, it is not required to implement or have all the apparatuses shown in FIG. 3. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a non-transitory computer-readable medium, and the computer program contains program codes for executing the method shown in the flowchart. In such an embodiment, the computer program may be downloaded and installed from a network through the communication apparatus 309, or installed from the storage apparatus 308, or installed from the ROM 302. When the computer program is executed by the processing apparatus 301, the above-mentioned functions defined in the method of the embodiments of the present disclosure are executed.

It should be noted that, the above-mentioned computer-readable medium in the present disclosure may be a computer-readable signal medium or a computer-readable storage medium or any combination of the both. The computer-readable storage medium may be, for example, but not limited to, an electrical, magnetic, optical, electromagnetic, infrared, or semiconductor system, apparatus or device, or any combination of the above. More specific examples of the computer-readable storage medium may include, but are not limited to: an electrical connection with one or more wires, a portable computer disk, a hard disk, a random access memory (RAM), a read only memory (ROM), an erasable programmable read-only memory (EPROM or flash memory), an optical fiber, a compact disc read-only memory (CD-ROM), an optical storage device, a magnetic storage device, or any suitable combination of the above. In the present disclosure, a computer-readable storage medium may be any tangible medium that includes or stores programs, and the programs may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal may adopt many forms, including but not limited to, an electromagnetic signal, an optical signal, or any suitable combination of the above. The computer-readable signal medium may also be any computer-readable medium other than the computer-readable storage medium, the computer-readable signal medium may send, propagate, or transmit the program used by or in combination with the instruction execution system, apparatus, or device. The program code contained on the computer-readable medium may be transmitted by any suitable medium, including but not limited to: a wire, an optical cable, a RF (Radio Frequency), etc., or any suitable combination of the above.

In some embodiments, the client and server can use any currently known or future developed network protocol, such as HTTP (hypertext transfer protocol), to communicate, and can be communicatively interconnected with digital data (e.g., communication network) in any form or medium. The example of a communication network includes a local area network ("LAN"), a wide area network ("WAN"), the Internet work (e.g., the Internet), and a peer-to-peer network (e.g., an ad hoc peer-to-peer network), and any currently known or future developed network.

The above-mentioned computer-readable medium may be included in the above-mentioned electronic device; or it may exist alone without being assembled into the electronic device.

The above-mentioned computer-readable medium carries one or more programs, and when the above-mentioned one or more programs are executed by the electronic device, the electronic device may: in response to an instruction for adding a special effect object on an initial image, determine a target display region of the special effect object on the initial image, where the target display region is a foreground region or a background region of the initial image, the foreground region is an image region where a target object is located in the initial image, and the background region is an image region other than the foreground region in the initial image; and display a part of the special effect object located in the target display region on the initial image to obtain a target image.

The computer program code used to perform operations of the present disclosure may be written in one or more programming languages or a combination thereof. The above-mentioned programming languages include, but not limited to, an object-oriented programming language—such as Java, Smalltalk, C++, and also include a conventional procedural programming language—such as "C" language or similar programming languages. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (LAN) or a wide area network (WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of codes, and the module, the program segment, or the part of codes contains one or more executable instructions for implementing a designated logical function. It should also be noted that, in some alternative implementations, the functions marked in the blocks may also occur in an order different from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments described in the present disclosure may be implemented in software or hardware. Where a name of a unit does not constitute a limitation on the unit itself in one case.

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium, which may include or store a program for use by or in combination with an instruction execution system, apparatus or device. The machine readable medium may be a machine readable signal medium or a machine readable storage medium. The machine readable medium may include, but is not limited to, an electronic, magnetic, optical, electromagnetic, infrared, or semiconductor system, apparatus or device, or any suitable combination of the above. More specific examples of the machine readable storage medium will include an electrical connection based on one or more lines, a portable computer disk, a hard disk, a random access memory (RAM), a read only memory (ROM), an erasable programmable read only memory (EPROM or flash memory), an optical fiber, a portable compact disc read-only memory (CD-ROM), an optical storage device, a magnetic storage device, or any suitable combination of the above.

According to one or more embodiments of the present disclosure, an image special effect processing method is provided, including:

in response to an instruction for adding a special effect object on an initial image, determining a target display region of the special effect object on the initial image, where the target display region is a foreground region or a background region of the initial image, the foreground region is an image region where a target object is located in the initial image, and the background region is an image region other than the foreground region in the initial image; and displaying a part of the special effect object located in the target display region on the initial image to obtain a target image.

Further, where displaying the part of the special effect object located in the target display region on the initial image to obtain the target image includes:

determining an overlapping region of a position region of the special effect object on the initial image and the target display region;

cutting a part located in the overlapping region from the special effect object as a target display object; and displaying the target display object on an upper layer of the overlapping region of the initial image to obtain the target image.

Further, the method further includes:

in response to an operation by a user on a special effect parameter setting option on special effect setting interface, generating the instruction for adding the special effect object on the initial image, where the special effect parameter setting option is used for the user to set the special effect object and the target display region, and the instruction is used to indicate the special effect object and the target display region.

Further, the generating the instruction for adding the special effect object on the initial image includes:

in response to a selecting operation on a special effect navigation tree on a first interface, determining the special effect object;

in response to a selecting operation on a display region setting option on a second interface, determining the target display region; and generating the instruction according to the special effect object and the target display region.

Further, where determining the target display region of the special effect object on the initial image includes:

when the special effect object to be added includes a plurality of sub-effect objects, determining a target display region of each of the sub-effect objects respectively;

correspondingly, where displaying the part of the special effect object located in the target display region on the initial image to obtain the target image includes:

determining a display order of a respective sub-effect object in the special effect object respectively; and displaying a part of the respective sub-effect object in the special effect object located in a respective target display region of the respective sub-effect object on the initial image in sequence according to the display sequence of the respective sub-effect object in the special effect object, to obtain the target image.

Further, the method further includes:

in response to an enabling trigger operation by a user on a switch option on a special effect setting interface, setting to a special effect enabled state;

where the displaying the part of the special effect object located in the target display region on the initial image to obtain the target image specifically includes: under the special effect enabled state currently, displaying the part of the special effect object located in the target display region on the initial image to obtain the target image.

Further, the special effect object is a sticker and/or a frame marking the target display region.

According to one or more embodiments of the present disclosure, an image special effect processing apparatus is provided, including:

a target display region determining module, configured to:

in response to an instruction for adding a special effect object on an initial image, determine a target display region of the special effect object on the initial image, where the target display region is a foreground region or a background region of the initial image, the foreground region is an image region where a target object is located in the initial image, and the background region is an image region other than the foreground region in the initial image; and a special effect displaying module, configured to display a part of the special effect object located in the target display region on the initial image to obtain a target image.

Further, the special effect displaying module is specifically configured to: determine an overlapping region of a position region of the special effect object on the initial image and the target display region; cut a part located in the overlapping region from the special effect object as a target display object; and display the target display object on an upper layer of the overlapping region of the initial image to obtain the target image.

Further, the apparatus further includes:

an instruction generating module, configured to: in response to an operation by a user on a special effect parameter setting option on special effect setting interface, generate the instruction for adding the special effect object on the initial image, where the special effect parameter setting option is used for the user to set the special effect object and the target display region, and the instruction is used to indicate the special effect object and the target display region.

Further, the instruction generating module is specifically configured to: in response to a selecting operation on a special effect navigation tree on a first interface, determine the special effect object; in response to a selecting operation on a display region setting option on a second interface, determine the target display region; and generate the instruction according to the special effect object and the target display region.

Further, the target display region determining module is specifically configured to: when the special effect object to be added includes a plurality of sub-effect objects, determine a target display region of each of the sub-effect objects respectively; correspondingly, the special effect object displaying module is specifically configured to: determine a display order of a respective sub-effect object in the special effect object respectively; display a part of the respective sub-effect object in the special effect object located in a respective target display region of the respective sub-effect object on the initial image in sequence according to the display sequence of the respective sub-effect object in the special effect object, to obtain the target image.

Further, the apparatus also includes:

a special effect enabled/disabled module, configured to: in response to an enabling trigger operation by a user on a switch option on a special effect setting interface, set to a special effect enabled state;

where the special effect displaying module is specifically configured to: under the special effect enabled state currently, display the part of the special effect object located in the target display region on the initial image to obtain the target image.

Further, the special effect object is a sticker and/or a frame marking the target display region.

According to one or more embodiments of the present disclosure, an electronic device is provided, including:

a memory, configured to store non-transitory computer-readable instructions; and a processor, configured to run the computer-readable instructions, so that when the processor executes the computer-readable instructions, the above-mentioned image special effect processing method is implemented.

According to one or more embodiments of the present disclosure, a computer-readable storage medium is provided, which is configured to store non-transitory computer-readable instructions, where when the non-transitory computer-readable instructions are executed by a computer, the computer is caused execute the above-mentioned image special effects processing method.

According to one or more embodiments of the present disclosure, a computer program product is provided, which includes a computer program instruction, where the computer program instructions causes a computer to execute the above-mentioned image special effect processing method.

According to one or more embodiments of the present disclosure, a computer program is provided, when the computer program runs on a computer, the computer is caused to execute the image special effect processing method.

The above description is only for preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by superposition of the above technical features or equivalent features without departing from the above disclosed concept, for example, technical solutions formed by replacement of the above-mentioned features and the technical features disclosed in the present disclosure (but not limited thereto) having similar functions.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features or method logical actions, it should be understood that the subject matter defined in the appended claims is not limited to the specific features or actions described above. On the contrary, the specific features and actions described above are only exemplary forms for implementing the claims.

What is claimed is:

1. An image special effect processing method, comprising:

in response to an operation by a user on a special effect parameter setting option on a special effect setting interface, generating an instruction for adding one special effect object on an initial image, wherein the special effect parameter setting option comprises at least two of a special effect option for displaying on a foreground region, a special effect option for displaying on a background region, or a special effect option for marking an edge of the foreground region;

in response to the instruction for adding the one special effect object on the initial image, and in response to a switch operation by the user on a switch option on a special effect setting interface provided for the user to choose whether to distinguish between the foreground region and the background region when the one special effect object is added:

in a disabling switch operation, displaying the one special effect object on the initial image; and in an enabling switch operation:

determining a target display region of the one special effect object on the initial image, wherein the target display region is the foreground region or the background region of the initial image, the foreground region is an image region where a target object is located in the initial image, and the background region is an image region other than the foreground region in the initial image; and displaying a first part of the one special effect object located in the target display region on the initial image to obtain a target image, wherein the one special effect object comprises the first part and a second part, wherein the second part of the one special effect object is located outside the target display region and is not displayed;

wherein displaying the first part of the one special effect object located in the target display region on the initial image to obtain the target image comprises:

determining an overlapping region of a position region of the one special effect object on the initial image and the target display region;

cutting the first part located in the overlapping region from the one special effect object as a target display object; and displaying the target display object on an upper layer of the initial image to obtain the target image;

wherein determining the target display region of the one special effect object on the initial image comprises:

when the one special effect object comprises a plurality of sub-effect objects, determining a target display region of each of the sub-effect objects in the one special effect object respectively;

correspondingly, wherein displaying the first part of the one special effect object located in the target display region on the initial image to obtain the target image comprises:

determining a display order of a respective sub-effect object in the one special effect object respectively; and displaying a first part of the respective sub-effect object in the one special effect object located in a respective target display region of the respective sub-effect object on the initial image in sequence according to the display sequence of the respective sub-effect object in the one special effect object, to obtain the target image.

2. The method according to claim 1, wherein in response to the operation by the user on the special effect parameter setting option on the special effect setting interface, generating the instruction for adding the one special effect object on the initial image comprises:

in response to a selecting operation on a special effect navigation tree on a first interface, determining the one special effect object;

in response to a selecting operation on a display region setting option on a second interface, determining the target display region; and generating the instruction according to the one special effect object and the target display region.

3. The method according to claim 1, wherein the one special effect object is at least one of a sticker and a frame marking the target display region.

4. An image special effect processing apparatus, comprising:

at least one processor; and a memory communicatively connected to the at least one processor; wherein, the memory stores instructions executable by the at least one processor, and the instructions are executed by the at least one processor, so that the at least one processor is configured to:

in response to an operation by a user on a special effect parameter setting option on a special effect setting interface, generating an instruction for adding one special effect object on an initial image, wherein the special effect parameter setting option comprises at least two of a special effect option for displaying on a foreground region, a special effect option for displaying on a background region, or a special effect option for marking an edge of the foreground region;

in response to the instruction for adding one the special effect object on the initial image, and in response to a switch operation by the user on a switch option on a special effect setting interface provided for the user to choose whether to distinguish between the foreground region and the background region when the one special effect object is added:

in a disabling switch operation, display the one special effect object on the initial image; and in an enabling switch operation, determine a target display region of the one special effect object on the initial image, wherein the target display region is the foreground region or the background region of the initial image, the foreground region is an image region where a target object is located in the initial image, and the background region is an image region other than the foreground region in the initial image; and display a first part of the one special effect object located in the target display region on the initial image to obtain a target image, wherein the one special effect object comprises the first part and a second part, wherein the second part of the one special effect object is located outside the target display region and is not displayed;

wherein the at least one processor is configured to:

determine an overlapping region of a position region of the one special effect object on the initial image and the target display region;

cut the first part located in the overlapping region from the one special effect object as a target display object;

display the target display object on an upper layer of the initial image to obtain the target image;

when the one special effect object to be added includes a plurality of sub-effect objects, determine a target display region of each of the sub-effect objects respectively; and correspondingly, the at least one processor is specifically configured to:

determine a display order of a respective sub-effect object in the one special effect object respectively;

display a first part of the respective sub-effect object in the one special effect object located in a respective target display region of the respective sub-effect object on the initial image in sequence according to the display sequence of the respective sub-effect object in the one special effect object, to obtain the target image.

5. The apparatus according to claim 4, wherein the at least one processor is configured to:

in response to a selecting operation on a special effect navigation tree on a first interface, determine the one special effect object;

in response to a selecting operation on a display region setting option on a second interface, determine the target display region; and generate the instruction according to the one special effect object and the target display region.

6. The apparatus according to claim 4, wherein the one special effect object is at least one of a sticker and a frame marking the target display region.

7. A non-transitory computer-readable storage medium, configured to store non-transitory computer-readable instructions, wherein when the non-transitory computer-readable instructions are executed by a computer, the computer is caused to execute steps of:

in response to an operation by a user on a special effect parameter setting option on a special effect setting interface, generate an instruction for adding one special effect object on an initial image, wherein the special effect parameter setting option comprises at least two of a special effect option for displaying on a foreground region, a special effect option for displaying on a background region, or a special effect option for marking an edge of the foreground region;

in response to the instruction for adding the one special effect object on the initial image, and in response to a switch operation by the user on a switch option on a special effect setting interface provided for the user to choose whether to distinguish between the foreground region and the background region when the one special effect object is added:

in a disabling switch operation, displaying the one special effect object on the initial image; and in an enabling switch operation:

determining a target display region of the one special effect object on the initial image, wherein the target display region is the foreground region or the background region of the initial image, the foreground region is an image region where a target object is located in the initial image, and the background region is an image region other than the foreground region in the initial image; and displaying a first part of the one special effect object located in the target display region on the initial image to obtain a target image, wherein the one special effect object comprises the first part and a second part, wherein the second part of the one special effect object is located outside the target display region and is not displayed;

wherein the computer instructions are further used to perform the following steps:

determining an overlapping region of a position region of the one special effect object on the initial image and the target display region;

cutting the first part located in the overlapping region from the one special effect object as a target display object; and displaying the target display object on an upper layer of the initial image to obtain the target image;

when the one special effect object comprises a plurality of sub-effect objects, determining a target display region of each of the sub-effect objects in the one special effect object respectively:

correspondingly, wherein displaying the first part of the one special effect object located in the target display region on the initial image to obtain the target image comprises:

determining a display order of a respective sub-effect object in the one special effect object respectively; and displaying a first part of the respective sub-effect object in the one special effect object located in a respective target display region of the respective sub-effect object on the initial image in sequence according to the display sequence of the respective sub-effect object in the special effect object, to obtain the target image.

8. The non-transitory computer-readable storage medium according to claim 7, wherein the computer instructions are further used to perform the following steps:

in response to a selecting operation on a special effect navigation tree on a first interface, determining the one special effect object;

in response to a selecting operation on a display region setting option on a second interface, determining the target display region; and generating the instruction according to the one special effect object and the target display region.

\*    \*    \*    \*    \*